United States Patent [19]

Kelly

[11] Patent Number: 5,396,252
[45] Date of Patent: Mar. 7, 1995

[54] MULTIPLE TARGET DISCRIMINATION

[75] Inventor: James A. Kelly, Danbury, Conn.

[73] Assignee: United Technologies Corporation, Hartford, Conn.

[21] Appl. No.: 129,710

[22] Filed: Sep. 30, 1993

[51] Int. Cl.[6] .................. G01S 7/292; G01S 13/66; G01S 13/50

[52] U.S. Cl. .................. 342/94; 342/95; 342/96; 342/160; 342/161; 342/162

[58] Field of Search .............. 342/94, 95, 96, 97, 342/160, 161, 162

[56] References Cited

U.S. PATENT DOCUMENTS

| | | | |
|---|---|---|---|
| 3,831,174 | 8/1974 | King et al. | 342/90 |
| 3,836,964 | 9/1974 | Evans | 342/90 |
| 3,869,601 | 3/1975 | Metcalf | 342/96 X |
| 3,987,440 | 10/1976 | Danzer | 342/96 |
| 4,000,490 | 12/1976 | Lader | 342/95 |
| 4,005,415 | 1/1977 | Kossiakoff et al. | 342/90 |
| 4,062,012 | 12/1977 | Colbert et al. | 342/90 |
| 4,077,038 | 2/1978 | Heller et al. | 342/92 |
| 4,079,376 | 3/1978 | Kirk, Jr. | 342/93 |
| 4,862,177 | 8/1989 | Wong | 342/160 |

*Primary Examiner*—John B. Sotomayor
*Attorney, Agent, or Firm*—Michael Grillo

[57] ABSTRACT

A target tracking system (10) comprises sensors (12) which provide data corresponding to a region of interest, the data being time dependent and consisting of amplitudes, ranges and angles. A window (202) is placed around data of interest, the size of the window being determined based on target size, assumed speed and acceleration characteristic, and the window is thereafter broken down into a plurality of smaller windows (208), thereby forming a grid having a nodal point (210) at each corner of the smaller windows. The data within the window is stored in a matrix, and background noise is thereafter minimized by filtering the data past a threshold value (215). The filtered data is analyzed to determine its distance weighted contribution at each nodal point (219), and the weighted distances are summed for each nodal point resulting in a nodal point magnitude for each of the nodal points (220). A nodal point having the maximum magnitude is selected (221) and its magnitude is compared to a target threshold value (227). A first target is determined to be present if the nodal point magnitude is greater than the target threshold value. The weighted contribution of the nodal data corresponding to the first target is removed from the nodal point magnitude for each of the nodal points (230-237), and thereafter, the procedure is repeated until all targets have been identified and deleted (221-237).

17 Claims, 2 Drawing Sheets

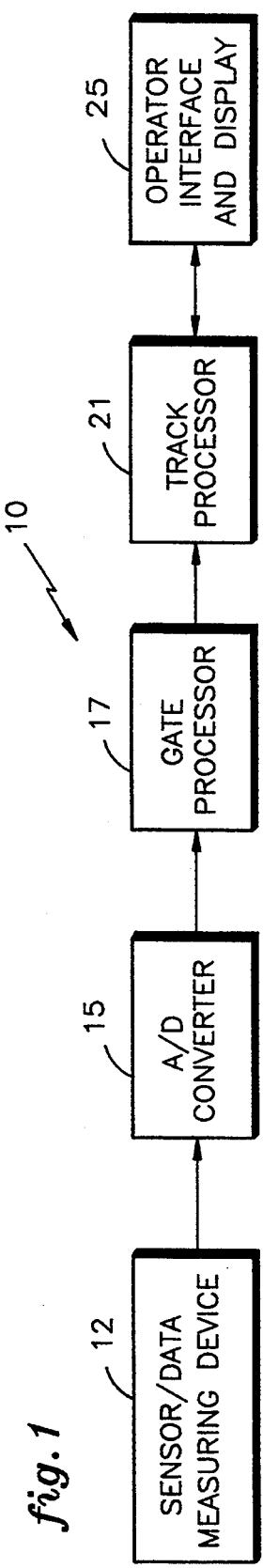
fig. 1
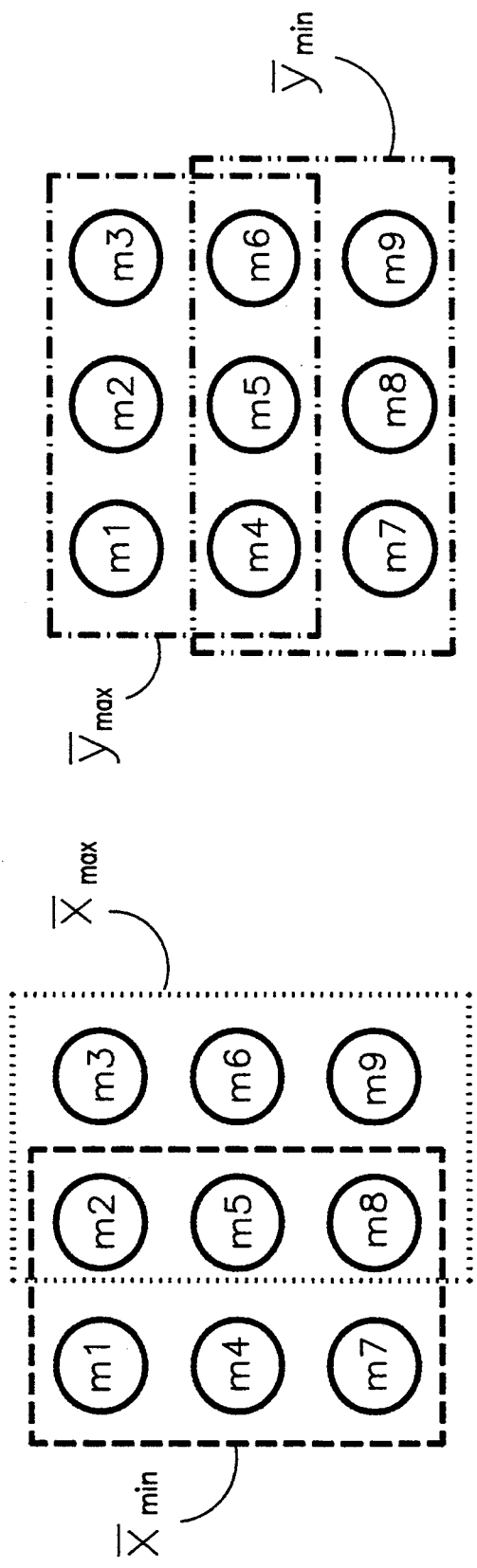
fig. 3A
fig. 3B

MULTIPLE TARGET DISCRIMINATION

TECHNICAL FIELD

The present invention relates to target tracking systems, and more particularly, to an improved target tracking system for detecting and tracking a primary target among a plurality of secondary targets.

BACKGROUND OF THE INVENTION

In order for a target tracking system to lock onto a given target, a sensor must first locate/detect the target to allow the tracking system to follow the target's movement with respect to the tracking system so that the tracking system may predict where the target will be in the immediate future. The first step of this procedure, the locating phase, currently involves detecting an object within a window, and determining the position of the object. It is the target position that is tracked by the system.

Tracking a target presents certain problems associated with the target environment. The first problem is that a track is easily corrupted by other targets, e.g., ships, planes, land and clutter, entering a track window. This problem causes a position error in the tracked target's position calculation. The position error directly affects the forecast position, velocity and position uncertainty estimates for the track. With increased position error, a larger window is required around the target's forecast position, thereby increasing the probability that the target track will be corrupted by other targets. In addition, tracking becomes increasingly difficult when a weak target is being tracked around stronger targets.

Another deficiency with current target tracking systems is their difficulty in differentiating between two closely situated targets. Tracking systems tend to mistakenly characterize two targets as one and attempt to track the combination. For example, two ships traveling parallel to one another may be detected and tracked as one target. Moreover, while attempting to track a target with current systems, additional targets that enter the window reduce the accuracy of the track. Additionally, the ability to determine initial target track is greatly inhibited when starting a track window around multiple targets.

SUMMARY OF THE INVENTION

Objects of the invention include provision of an improved target tracking system for detecting and tracking a primary target among a plurality of secondary targets.

A further object of the present invention is to provide a target tracking system which discriminates between targets passing in close proximity to one another.

A still further object of the present invention is to provide a target tracking system which allows the tracking of a weak signal strength target in close proximity to stronger signal strength targets.

A further object of the present invention is to provide a target tracking system for rapidly and accurately detecting, discriminating and tracking multiple targets of varying signal strength and in close proximity having reduced computational requirements.

According to the present invention, sensors provide data corresponding to a region of interest, the data being time dependent and consisting of amplitudes, ranges and angles. A window is placed around data of interest, the size of the window being determined based on target size, assumed speed and acceleration characteristic, and the window is thereafter broken down into a plurality of smaller windows, thereby forming a grid having a nodal point at each corner of the smaller windows. The data within the window is stored in a matrix, and background noise is thereafter minimized by filtering the data past a threshold value. The filtered data is analyzed to determine its distance weighted contribution at each nodal point, and the weighted distances are summed for each nodal point resulting in a nodal point magnitude for each of the nodal points. A nodal point having the maximum magnitude is selected and its magnitude is compared to a target threshold value. A first target is determined to be present if the nodal point magnitude is greater than the target threshold value.

In further accord with the present invention, the weighted contribution of the nodal data corresponding to the first target is removed from the nodal point magnitude for each of the nodal points. Thereafter, the system selects the nodal point with the maximum magnitude after the contribution of the first target is removed and determines if its magnitude is greater than the target threshold value. If it is, a second target is identified, and its contribution is removed from the nodal point magnitude for each of the nodal points. The procedure is repeated until all targets have been identified and deleted.

In still further accord with the present invention, the target information is used to determine a new threshold value for analysis of the raw data, and is also used to predict the future position of the targets for purposes of establishing the window's position.

The present invention provides a significant improvement over the prior art by reducing the computational requirements of multiple target tracking systems. The system easily and quickly discerns between multiple targets that are closely situated. Therefore, the system provides the ability to accurately detect and track a target situated amongst a plurality of targets and to lock onto the primary target. An accurate determination of background noise levels is provided for allowing accurate determination of the presence of a target. By accurately describing background threshold levels and eliminating the data corresponding to stronger targets, weaker targets may also be identified from the data.

The foregoing and other objects, features and advantages of the present invention will become more apparent in light of the following detailed description of exemplary embodiments thereof, as illustrated in the accompanying drawings.

BRIEF DESCRIPTION OF THE DRAWINGS

FIG. 1 is a schematic block diagram of a target tracking system;

FIGS. 3a and 3b are diagrams showing the determination of mean nodal point values for four sides of a target region.

BEST MODE FOR CARRYING OUT THE INVENTION

Figure 2:
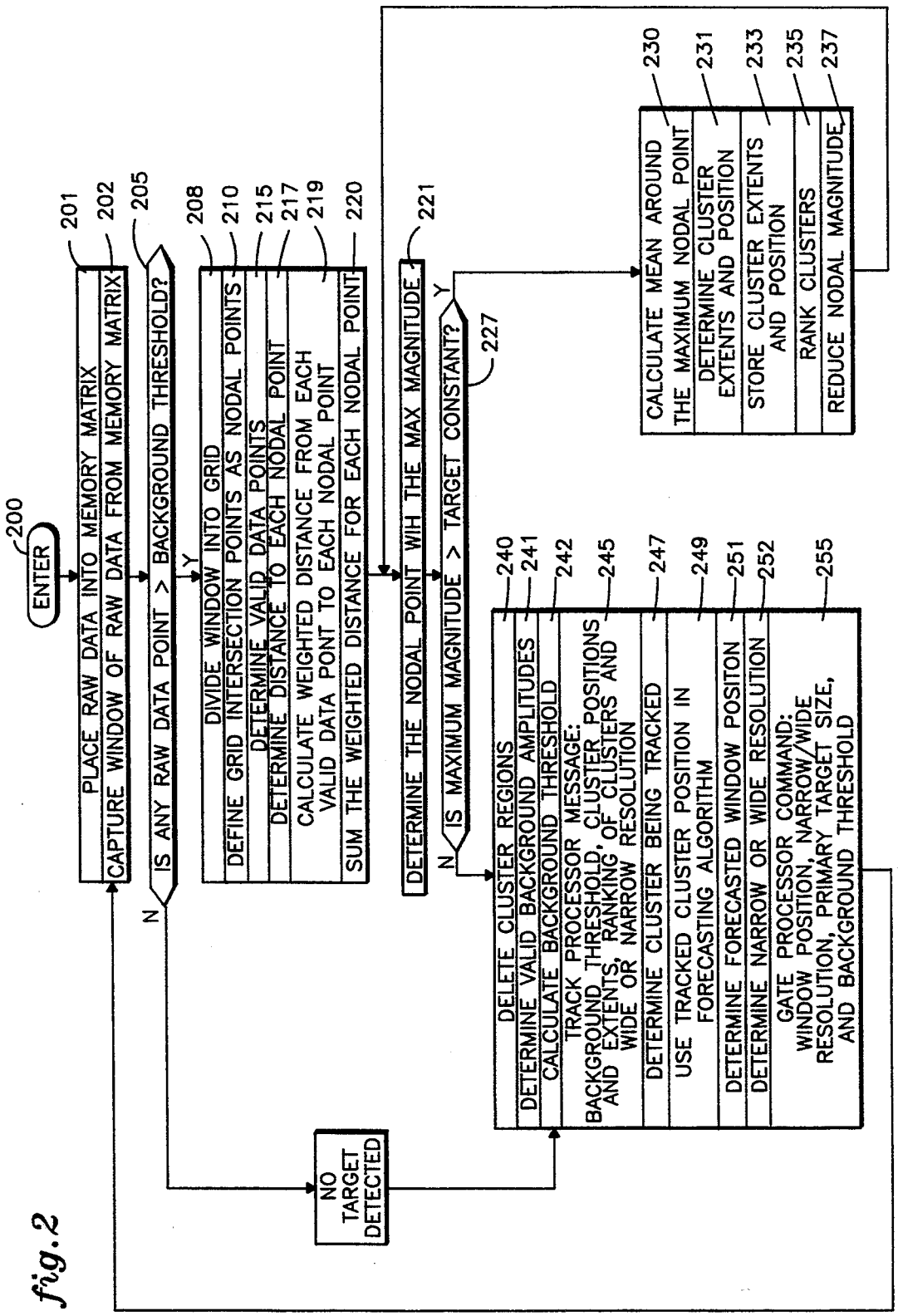
FIG. 2 is a logic flow diagram of a routine implemented by the tracking system of FIG. 1 for target tracking.

The target tracking system of the present invention is particularly well suited for detecting and tracking a primary target among a plurality of secondary targets.

Additionally, the system will discriminate between targets that pass in close proximity to one another and allows for the tracking of weaker targets in close proximity to stronger targets.

Referring to FIG. 1, the target tracking system 10 includes a sensor 12 for obtaining target data. The sensor may include a radar, sonar, FLIR or other suitable sensing device for providing data indicative of target position with respect to the sensor. For ease of understanding and description, the present invention will be described with respect to a radar sensor mounted on an aircraft. However, the target discrimination of the present invention may be used with any suitable target sensing apparatus, either vehicle mounted or fixly mounted.

The radar system transmits pulses of energy and measures the amplitude of the corresponding returns over range for specific azimuth angles. This process is continuously repeated as the antenna rotates around a search pattern. The target data provided by the sensor 12 is typically analog data, and therefore the data is provided to an analog to digital converter 15 which converts the analog measurements into digital values representing amplitude, range and azimuth angle. The digitized data is thereafter provided to a gate processor 17. The gate processor is responsive to a track processor 21 for analyzing a specific window of data. For purposes of the present invention, the term "window of data" is intended to refer to all of the data points as measured by the sensor 12 the range and azimuth of which fall into a window defined by specific range and azimuth values. The gate processor 17 performs the subroutine of FIG. 2 for analyzing and providing primary and secondary target data to the track processor 21, as will be described in greater detail hereinafter. The gate processor 17 is a known micro-processor such as a Motorola model 680XX micro-processor.

The track processor 21 uses known target analysis processing for determining the track of the various targets being tracked. The track processor 21 starts and deletes tracks automatically or by operator commands. Once a track is initiated, the track processor outputs a window request to the gate processor 17. The window corresponds to the area in which targets of interest are expected to be found. The track information is provided to an operator interface and display unit 25 wherein a pilot or other radar operator can view the track information, select a target to be tracked and perform various other fire control and target tracking functions. The track processor 21 predicts the future position of the targets being tracked based on the previous target information. The predicted target position information is provided by the track processor 21 to the gate processor to be used in the subroutine of FIG. 2 for analyzing target data.

Referring now to FIG. 2, the subroutine implemented by the gate processor 17 (FIG. 1) is entered in a step 200, and then a step 201 is performed wherein raw data (digitized data), obtained from a search pattern of the radar antenna and provided via the analog to digital converter 15 (FIG. 1 ), is stored in a gate processor memory. For purposes of describing the present invention, the raw data provided to the gate processor by the analog to digital converter is a data set consisting of a digital amplitude at a location designated by a range and an azimuth, $\rho$ and $\theta$ respectively. The raw data is stored in the memory as a matrix (array) given by equation 1 below:

$$\text{Amplitude}[\rho,\theta] = \begin{vmatrix} (\rho_1,\theta_1) & (\rho_1,\theta_2) & \cdots & (\rho_1,\theta_m) \\ (\rho_2,\theta_1) & \cdot & \cdot & \cdot \\ \cdot & \cdot & \cdot & \cdot \\ (\rho_n,\theta_1) & \cdots & \cdots & (\rho_n,\theta_m) \end{vmatrix} \quad \text{(eq. 1)}$$

Next, a step 202 is performed wherein a window of raw data is selected from the memory matrix for analysis. Initially, the data selected for analysis may correspond to the placement of a cursor by the pilot or radar operator, or the system may automatically select a window of data based on certain criteria such as amplitude, size of a target, number of returns, etc. The size of the window is based on the scan rate (t) of the radar and the anticipated acceleration (a) of the target. The radar's scan rate is the time it takes for the radar antenna to make a complete revolution. The target acceleration is selected based on the type of target being tracked, e.g., aircraft, ship, ground vehicle. If the type of vehicle is unknown, the system assumes the highest acceleration, e.g., aircraft acceleration. The size of the window in each axis is greater than or equal to $2at^2$ plus the target extent. For purposes of establishing the window size, the target extent is set equal to the antenna's apparent beam width in the azimuth axis and equal to the radar range resolution in the range axis. The antenna's apparent beam width is a function of the actual antenna beam width and the target signal strength. The range resolution is dependent on the characteristics of the radar in use.

The window containing the data to be analyzed is designated as Amplitude Set[$\rho$, $\theta$] and is contained within Amplitude[$\rho,\theta$]. Amplitude Set[$\rho$, $\theta$] is given by equation 2 below:

$$\begin{array}{c}\text{Amplitude}\\\text{Set}[\rho,\theta]\end{array} = \begin{vmatrix} (\rho_{imin},\theta_{jmin}) & \cdots & \cdots & (\rho_{imin},\theta_{jmax}) \\ \cdot & \cdot & \cdot & \cdot \\ \cdot & \cdot & \cdot & \cdot \\ (\rho_{imax},\theta_{jmin}) & \cdots & \cdots & (\rho_{imax},\theta_{jmax}) \end{vmatrix} \quad \text{(eq. 2)}$$

Next, a test 205 is performed wherein the raw data contained in Amplitude Set[$\rho$, $\theta$] is analyzed to determine if the amplitude of any of the raw data is greater than a background level (target threshold value). Most systems typically have difficulty in characterizing the background noise and clutter threshold level. This is because clutter and targets can make up a portion of the background, thereby reducing the weakest targets chance of being detected. Therefore, the threshold has to be set so amplitudes that represent targets will be above the threshold. Initially, the target threshold value is set equal to the average amplitude over the amplitude matrix Amplitude Set[$\rho$, $\theta$]. Alternatively, the threshold may be selected based on the expected type of target and the target environment. As will be described in greater detail hereinafter, once a target has been acquired, the threshold is determined based on an analysis of the target background environment.

If the results of the test 205 are positive, then data indicative of a target is present in the raw data, and the window containing the Amplitude Set[$\rho$, $\theta$] is broken down into a number of smaller windows which form a grid in a step 208. The intersection points of the smaller windows within the grid are called nodal points (NP)

and are defined as such in a step 210. For example, a window with four sub windows within its grid pattern has 9 nodal points. Each nodal point has a possibility of being an approximate cluster centroid. In step 208, either a wide or narrow grid spacing (resolution) is used based on how fine a target must be discriminated. When the system is initially started, the narrow grid spacing (narrow mode) is used. The system will thereafter switch to wide grid spacing (wide mode) when tracking a target provided that there are no other targets in close proximity to the target being tracked, e.g., there are no other targets within a region $\frac{1}{2}at^2$ of the target being tracked where a is the acceleration of the target being tracked. The system will switch back to narrow mode if another target enters the region around the target being tracked.

The wide grid spacing breaks the window down into approximately 64 sub windows, the size of each sub window being equal to $(\frac{1}{8}at^2 + \frac{1}{8}TS_{\rho,\theta})$ on each side, where TS is the dimension of the minimum detectable target size. Therefore there is approximately 81 nodal points (9×9) in the wide grid spacing. $TS_\rho$ is initially set equal to the radar's range resolution, and $TS_\theta$ is initially set equal to the radar antenna's 3 dB beam width times the range to the target. Once the system measures the actual extents of the target as described hereinafter, these measurements are used to determine $TS_\rho$ and $TS_\theta$.

The fine grid spacing is determined using the sensor's resolution (SR) and TS. Equation 3 below shows how the nodal distance for fine grid spacing is determined based on radar characteristics:

depth, y axis: $\rho_1 = \rho_{max} - \rho_{min} = 2at^2 + TS_\rho$ arc length, x axis: $\theta_1 = \theta_{max} - \theta_{min} = 2at^2 + TS_\theta$ Number of y axis nodal points: $N_y = (\rho_1 \times 1/(TS_\rho + SR_y)) + 1$ Number of x axis nodal points: $N_x =$ $$(\rho_{min}\theta_1 + 1/(TS_\theta + SR_x)) + 1$$

where:

$$\rho\theta_1 = (\theta_1/57.3) \times \rho \text{ and } \theta_1/57.3$$

converts degrees to radians

The minimum target size is determined based on the radar's performance characteristics. The target azimuth length is an arc length of a point source target. The arc length is a function of the apparent antenna beam width, target strength, and the range to the target. It is unlikely that the arc length will be much greater than a 3 dB antenna beam width unless the target's physical size is larger than one beam width or a strong return is detected below the antenna's 3 dB beam width. In the case of a strong target, a tolerance around one beam width would suffice. This is because a radar antenna's main beam drops off quickly moving away from the electrical boresight of the antenna. This may occur when a large ship has a course towards the radar system. The range length of a target is a function of the radar range resolution. The target's radial length will not be greater unless the target is radially longer than the sensor's range resolution. This may occur when a large ship has a course toward the radar system.

The Amplitude Set[$\rho$, $\theta$] is made up of both valid data points having amplitudes greater than the threshold level, and invalid data points having amplitudes less than the threshold level. The data points in the Amplitude Set[$\rho$, $\theta$] are compared to the threshold level and are validated or invalidated in a step 215. The validity results on the Amplitude Set[$\rho$, $\theta$] are stored in a Data Point Set[$\rho$, $\theta$] according equation 4 below:

If Amplitude Set[$\rho$, $\theta$]>threshold, then Data Point Set[$\rho$, $\theta$]=1, Else Data Point Set[$\rho$, $\theta$]=0

$$\text{DatapoinSet}[\rho,\theta] = \begin{vmatrix} (\rho_{imin},\theta_{jmin}) & \cdots & \cdots & (\rho_{imin},\theta_{jmax}) \\ \cdot & & & \cdot \\ \cdot & & & \cdot \\ \cdot & & & \cdot \\ (\rho_{imax},\theta_{jmin}) & \cdots & \cdots & (\rho_{imax},\theta_{jmax}) \end{vmatrix} \quad \text{(eq. 4)}$$

Next, a step 217 is performed wherein the distance from each valid data point in Data Point Set[$\rho$, $\theta$] to each nodal point is calculated. There are a number of ways to calculate the distance. A simple method is to use the Pythagorean theorem. The method used with the preferred embodiment of the present invention is to use an elliptical function as given in equation 5 below:

$$\text{Distance}(NP,DpS) = ((\rho(NP) - \rho(DpS)i)^2/a^2) + ((\rho\theta(NP) - \rho\theta(DpS)\,i)^2/b^2) \quad \text{(eq. 5)}$$

where:

$\rho(NP)$ = the nodal point position in the y(range) axis
$\rho(DpS)$ = the data point position in the y axis
$\rho\theta(NP)$ = the nodal point position in the x(azimuth) axis
$\rho\theta(DpS)$ = the data point position in the x axis The elliptical function uses constants, a and b, to control the response function in both axes. TS is used to determine a and b, wherein a is et equal to $TS_\rho/2$ and b is set equal to $TS_\theta/2$.

Once the distance between each valid data point in the Data Point Set[$\rho$, $\theta$] to a nodal point is determined, the weighted distance is calculated using the elliptical function in a step 219. The purpose of the weighting function is to weigh a data point heavily when close to a nodal point and lightly when far away. The weighting function is repeated until the sum of the weighted distance for each nodal point, i.e., the magnitude of each nodal point (MNP), is calculated in a step 220. The elliptical function is given in equation 6 below:

$$MNP(\rho,\rho\theta) = \quad \text{(eq. 6)}$$

$$\sum_{i=1}^{n} e^{-((\rho(NP)-\rho(DpS)i)^2/a^2) + ((\rho\theta(NP)-\rho\theta(DpS)i)^2/b^2))} =$$

$$\sum_{i=1}^{n} e^{-\text{Distance}(NP,DpS)}$$

for 1 to n valid data points.

The constants, a and b, used in equation 6 are the same as the constants used in equation 5 above.

The nodal point with the maximum magnitude ($NP_m$) is then determined in a step 221. Next, a test 227 is performed wherein the subroutine determines if the $NP_m$ is greater than a target constant. $NP_m$ has to be greater than a threshold (target constant) to be considered a real target cluster. The target constant is a function of the minimum number of data points required to make up a valid target as weighted using equation 6 above.

If the results of the test 227 are positive, a valid target is identified, and the position of the maximum nodal point corresponds to the approximate position of a target. Next, a step 230 is performed to determine the exact position and extents of the target. First, a region is established around the maximum nodal point, and a mean is calculated for four sides of the region. The region is illustrated in FIG. 3, and includes the maximum nodal point as the center of the region and the approximate region of nodal points making up the target. In the wide mode, the nodal points in the region are immediately adjacent to the maximum nodal point. Therefore, nine nodal points make up the region in the wide mode. For purposes of illustrating the determination of a mean value for four sides of the region during operation in the wide mode, the nodal points in the region are designated as m1 through m9, with m5 being the maximum nodal point. The mean value for the four sides of the region are determined using equations 7 through 10 below (as illustrated in FIGS. 3a and 3b):

$$\bar{y}\text{max} = \frac{\Sigma(m_1 + m_2 + m_3 + m_4 + m_5 + m_6)}{6} \quad (\text{eq. 7})$$

$$\bar{y}\text{min} = \frac{\Sigma(m_4 + m_5 + m_6 + m_7 + m_8 + m_9)}{6} \quad (\text{eq. 8})$$

$$\bar{x}\text{max} = \frac{\Sigma(m_2 + m_3 + m_5 + m_6 + m_8 + m_9)}{6} \quad (\text{eq. 9})$$

$$\bar{x}\text{min} = \frac{\Sigma(m_1 + m_2 + m_4 + m_5 + m_7 + m_8)}{6} \quad (\text{eq. 10})$$

Next, the subroutine performs a step 231 to determine the position and extent of the target. The extent of a target is it boundaries, e.g., size, and is determined using a standard interpolation method. The target extents are determined by interpolating the coordinates surrounding the maximum nodal point and determining the position between the maximum nodal point and other surrounding nodal points where the amplitude is equal to the mean for the region. Thereafter, the target position is determined as the center of the boundary which defines the target extents. The position and extents of the target are stored in a step 233. Next, a step 235 is performed wherein the cluster is ranked based on its proximity to the predicted target position, e.g., its proximity to the predicted position of a target being tracked, and based on its size in comparison to the size of the target being tracked.

The magnitude of each of the nodal points is modified by an amount equal to the contribution of that target to the nodal point magnitude in a step 237. The magnitude of each of the nodal points is modified using the equation 11 below:

$$MNP(\rho,\rho\theta)_{new} = MNP(\rho,\rho\theta)_{old} - \quad (\text{eq. 11})$$
$$NPm(\rho,\rho\theta)e^{-(((NPm(\rho)-NP(\rho))2/a^2)+((NPm(\rho\theta)-NP(\rho\theta))2/b^2))}$$

where:
NPm($\rho$, $\rho\theta$)=Maximum Nodal Point at position $\rho$, $\rho\theta$ and
a and b are based on the target extents calculated in step 231.

For example, if there are four targets within the window, once the position and extent of the one of the targets (the strongest or maximum target) is determined in the steps 230 through 235, the weighted contribution of that target to the magnitude of each of the nodal points is removed as if that target didn't exist. Thereafter, the subroutine returns to the steps and test 221 through 235 to determine the position and extents of the target having the second highest magnitude. Step 237 is then performed to delete the contribution of the target having the second highest magnitude.

The steps and tests 221-237 are repeated until the position and extent of all targets has been determined and its magnitude deleted. Once the position and extent of all of the targets has been determined, the results of the test 227 will be negative, and steps 240 through 242 are performed wherein a new background threshold is determined. First, step 240 is performed wherein a valid background data point set (BackgroundVDP[$\rho$, $\theta$]) is created which identifies each data point in the Amplitude Set[$\rho$, $\theta$] which corresponds to a target cluster as identified in steps 221 through 235. BackgroundVDP[$\rho$, $\theta$] is given by equation 12 below:

For i=1 to n and j=1 to m, BackgroundVDP[$\rho_i$, $\theta_j$]=0 if cluster exists at $\rho_i$, $\theta_j$, else BackgroundVDP[$\rho_i$, $\theta_j$]=1.

$$\text{Background}VDP[\rho_i,\theta_j] = \begin{vmatrix} (\rho_1,\theta_1) & (\rho_1,\theta_2) & \cdots & (\rho_1,\theta_m) \\ (\rho_2,\theta_1) & \cdot & & \cdot \\ \cdot & & & \cdot \\ (\rho_n,\theta_1) & \cdots & \cdots & (\rho_n,\theta_m) \end{vmatrix} \quad (\text{eq. 12})$$

In step 241, the background data point amplitudes are stored in a background data point set (BackgroundDP[$\rho$, $\theta$]). BackgroundDP[$\rho$, $\theta$] is determined by multiplying Amplitude Set[$\rho$, $\theta$] by BackgroundVDP[$\rho$, $\theta$]. Therefore, the data points in BackgroundDP[$\rho$, $\theta$] correspond only to background noise levels. Finally, step 242 is performed wherein the background threshold is determined as the average amplitude of the data points contained in BackgroundDP[$\rho$, $\theta$] as given in equation 13 below:

$$\text{Background threshold} = \frac{\sum_{i=1}^{n}\sum_{j=1}^{m} \text{Background}DP[\rho_i,\theta_j]}{\sum_{i=1}^{n}\sum_{j=1}^{m} \text{Background}VDP[\rho_i,\theta_j]} \quad (\text{eq. 13})$$

In step 245, targeting information including the cluster ranking, extents and positions is provided by the gate processor 17 (FIG. 1) to the track processor 21 (FIG. 1). Next, step 247 is performed wherein the track processor determines the cluster being tracked based on the target ranking and position information. Thereafter, the track processor uses a known forecasting algorithm to estimate the future position of the target of interest in a step 249. The forecasted target position is used in a step 251 to determine the next forecasted window position. Additionally, the track processor uses the target information in a step 252 to determine whether to remain in narrow resolution or switch to wide resolution. As described hereinbefore, the track processor will start out in narrow mode, and thereafter switch to wide mode if no other targets are within $\frac{1}{2}at^2$ of the target of interest, wherein a is the acceleration of the target of interest. If the system is operating in the wide mode, it will switch back to the narrow mode if a target enters the $\frac{1}{2}at^2$ region around the target being tracked. Finally, a step 255 is performed wherein the track processor provides the gate processor with: the window position; the grid resolution, e.g., narrow or wide mode; the target extents, and the background threshold level.

If none of the raw data was above the threshold level, the results of the test 205 are negative, and no target is present in the current data window. Thereafter, the subroutine performs the steps 242 through 255 to determine the position and size of the next data window and to open the window in that next position.

The invention is described herein as determining the target extents using four separate means within a region around a maximum nodal point. However, the target extents can also be determined by calculating by determining the mean nodal point magnitude within the entire region around the maximum nodal point. Although the target position is described herein as being the center of the region defined by the target extents, the target position could be determined using other methods. For example, the target position could be determined by performing a center of mass calculation on the data corresponding to the target of interest, i.e., with the data corresponding to other targets removed. Additionally, although the invention is described herein as determining a single window of raw data (Data Point Set[$\rho$, $\theta$]) for analysis of a primary target, multiple windows may be analyzed, each corresponding to a target being tracked.

Although the invention has been described and illustrated with respect to exemplary embodiments thereof, it should be understood by those skilled in the art that the foregoing and various other changes, omissions and additions may be made therein and thereto, without departing from the spirit and scope of the present invention.

I claim:

1. A method for detecting and tracking a target comprising the steps of:
    providing raw data signals each having an amplitude component and a position component;
    selecting all of the raw data signals having a position component which falls within a position window;
    defining a valid data point set consisting of data points each corresponding to a raw data signal within said position window having an amplitude component the magnitude of which is greater than a background threshold value;
    dividing said position window into a grid;
    defining each grid intersection as a nodal point;
    determining the weighted distance from each data point to each nodal point;
    determining the magnitude of each nodal point as the sum of said weighted distances for each nodal point; and
    assigning the nodal point having the maximum magnitude as an approximate target position if its magnitude is greater than a target constant.

2. The method for detecting and tracking a target according to claim 1 further comprising the steps of:
    defining a region of nodal points around the nodal point having the maximum magnitude;
    determining the mean nodal point magnitude within said region; and
    defining target extents as the interpolated position between the nodal point having the maximum magnitude and the other nodal points within said region where nodal point magnitude is equal to said mean nodal point magnitude.

3. The method for detecting and tracking a target according to claim 2 further comprising the step of defining the exact target position in the center of said target extents.

4. The method for detecting and tracking a target according to claim 2 further comprising the steps of:
    reducing the nodal point magnitude of each of said nodal points by an amount equal to the contribution of said data points the position component of which is within said target extents;
    assigning the nodal point having the maximum magnitude as an approximate target position if its magnitude is greater than said target constant;
    defining a region of nodal points around the nodal point having the maximum magnitude;
    determining the mean nodal point magnitude within said region;
    defining the target extents as the interpolated position between the nodal point having the maximum magnitude and the other nodal points within said region where nodal point magnitude is equal to said mean nodal point magnitude; and
    repeating the above steps until the magnitude of said nodal point having the maximum magnitude is not greater than said target constant.

5. The method for detecting and tracking a target according to claim 4 further comprising the steps of:
    defining a background data point set consisting of said raw data signals within said position window having a position component the position of which is not within said target extents for any one of said targets;
    determining said background threshold value as the average amplitude component magnitude of said raw data signals within said background data point set.

6. The method for detecting and tracking a target according to claim 4 further comprising the steps of:
    selecting one of said targets as a primary target;
    forecasting the future position of said primary target; and
    determining the position of said position window such that said forecasted primary target position is centered within said position window.

7. The method for detecting and tracking a target according to claim 4 wherein said step of dividing said position window into a grid further comprising the steps of:
    selecting one of said targets as a primary target;
    selecting a narrow grid spacing if another one of said targets is within a threshold distance of said primary target; and
    selecting a wide grid spacing if another one of said targets is not within said threshold distance of said primary target.

8. The method for detecting and tracking a target according to claim 1 further comprising the steps of:
    defining a region of nodal points around the nodal point having the maximum magnitude;
    defining four quadrants within said region;
    determining the mean nodal point magnitude within each of said quadrants; and
    defining target extents as the interpolated position between the nodal point having the maximum magnitude and the other nodal points within each of said quadrants where nodal point magnitude is equal to said mean nodal point magnitude for said quadrant.

9. The method for detecting and tracking a target according to claim 8 further comprising the step of defining the exact target position in the center of said target extents.

10. The method for detecting and tracking a target according to claim 8 further comprising the steps of:
   reducing the nodal point magnitude of each of said nodal points by an amount equal to the contribution of said data points the position component of which is within said target extents;
   assigning the nodal point having the maximum magnitude as an approximate target position if its magnitude is greater than said target constant;
   defining a region of nodal points around the nodal point having the maximum magnitude;
   defining four quadrants within said region;
   determining the mean nodal point magnitude within each of said quadrants;
   defining target extents as the interpolated position between the nodal point having the maximum magnitude and the other nodal points within each of said quadrants where nodal point magnitude is equal to said mean nodal point magnitude for said quadrant; and
   repeating the above steps until the magnitude of said nodal point having the maximum magnitude is not greater than said target constant.

11. The method for detecting and tracking a target according to claim 10 further comprising the steps of:
   defining a background data point set consisting of said raw data signals within said position window having a position component the position of which is not within said target extents for any one of said targets;
   determining said background threshold value as the average amplitude component magnitude of said raw data signals within said background data point set.

12. The method for detecting and tracking a target according to claim 10 further comprising the steps of:
   selecting one of said targets as a primary target;
   forecasting the future position of said primary target; and
   determining the position of said position window such that said forecasted primary target position is centered within said position window.

13. The method for detecting and tracking a target according to claim 10 wherein said step of dividing said position window into a grid further comprising the steps of:
   selecting one of said targets as a primary target;
   selecting a narrow grid spacing if another one of said targets is within a threshold distance of said primary target; and
   selecting a wide grid spacing if another one of said targets is not within said threshold distance of said primary target.

14. The method for detecting and tracking a target according to claim 4 further comprising the steps of:
   selecting at least one primary target;
   forecasting the future position of each of said primary targets; and
   determining the position of said position window such that said forecasted primary target positions are within said position window.

15. The method for detecting and tracking a target according to claim 4 further comprising the steps of:
   selecting at least one primary target;
   forecasting the future position of each of said primary targets; and
   determining the position of position windows such that each of said forecasted primary target positions is centered within a position window.

16. The method for detecting and tracking a target according to claim 10 further comprising the steps of:
   selecting at least one primary target;
   forecasting the future position of each of said primary targets; and
   determining the position of said position window such that said forecasted primary target positions are within said position window.

17. The method for detecting and tracking a target according to claim 10 further comprising the steps of:
   selecting at least one primary target;
   forecasting the future position of each of said primary targets; and
   determining the position of position windows such that each of said forecasted primary target positions is centered within a position window.

* * * * *